United States Patent
Burton et al.

(10) Patent No.: US 10,464,817 B2
(45) Date of Patent: Nov. 5, 2019

(54) EMM-26, A NOVEL SYNTHETIC CRYSTALLINE MATERIAL, ITS PREPARATION, AND ITS USE

(71) Applicants: Allen Burton, Stewartsville, NJ (US); Karl Strohmaier, Port Murray, NJ (US); Hilda Vroman, Piscataway, NJ (US); Mobae Afeworki, Phillipsburg, NJ (US); Peter I. Ravikovitch, Princeton, NJ (US); Charanjit S. Paur, Phillipsburg, NJ (US); Xiaodong Zou, Sollentuna (SE); Peng Guo, Stockholm (SE); Junliang Sun, Stockholm (SE)

(72) Inventors: Allen Burton, Stewartsville, NJ (US); Karl Strohmaier, Port Murray, NJ (US); Hilda Vroman, Piscataway, NJ (US); Mobae Afeworki, Phillipsburg, NJ (US); Peter I. Ravikovitch, Princeton, NJ (US); Charanjit S. Paur, Phillipsburg, NJ (US); Xiaodong Zou, Sollentuna (SE); Peng Guo, Stockholm (SE); Junliang Sun, Stockholm (SE)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 803 days.

(21) Appl. No.: 14/838,675

(22) Filed: Aug. 28, 2015

(65) Prior Publication Data

US 2016/0060129 A1  Mar. 3, 2016

Related U.S. Application Data

(60) Provisional application No. 62/045,094, filed on Sep. 3, 2014.

(51) Int. Cl.
| | | |
|---|---|---|
| *B01D 53/02* | (2006.01) | |
| *C01B 39/48* | (2006.01) | |
| *B01J 20/18* | (2006.01) | |
| *B01J 20/30* | (2006.01) | |

(52) U.S. Cl.
CPC .............. *C01B 39/48* (2013.01); *B01D 53/02* (2013.01); *B01J 20/18* (2013.01); *B01J 20/3078* (2013.01); *B01D 2253/108* (2013.01); *B01D 2257/504* (2013.01)

(58) Field of Classification Search
CPC .......... B01D 2253/10; B01D 2253/108; B01D 2257/504; B01D 53/02; B01J 20/18; B01J 20/183; B01J 20/3078; B01J 29/70; C01B 39/12; C01B 39/48; Y02C 10/08; Y02P 20/152

See application file for complete search history.

(56) References Cited

U.S. PATENT DOCUMENTS

| | | |
|---|---|---|
| 2,882,243 A | 4/1959 | Milton |
| 2,882,244 A | 4/1959 | Milton |
| 3,130,007 A | 4/1964 | Breck |
| 3,247,195 A | 4/1966 | Kerr |
| 3,314,752 A | 4/1967 | Kerr |
| 3,702,886 A | 11/1972 | Argauer et al. |
| 3,709,979 A | 1/1973 | Chu |
| 3,832,449 A | 8/1974 | Rosinski et al. |
| 3,972,983 A | 8/1976 | Ciric |
| 4,016,245 A | 4/1977 | Plank et al. |
| 4,076,842 A | 2/1978 | Plank et al. |
| 4,557,919 A | 12/1985 | Sumitani et al. |
| 4,954,325 A | 9/1990 | Rubin et al. |
| 4,981,663 A | 1/1991 | Rubin |
| 6,027,707 A | 2/2000 | Casci et al. |
| 6,136,290 A | 10/2000 | Benazzi et al. |
| 8,361,435 B2 | 1/2013 | Schreuder |
| 2012/0022279 A1 | 1/2012 | Cabiac et al. |
| 2012/0067216 A1 | 3/2012 | Corma Canos et al. |

FOREIGN PATENT DOCUMENTS

| | | |
|---|---|---|
| EP | 0135658 A2 | 4/1985 |
| WO | 9817581 A | 4/1998 |
| WO | 2010094851 A1 | 8/2010 |
| WO | 2010/099441 A2 | 9/2010 |
| WO | 2012/118742 A1 | 9/2012 |
| WO | 2014068135 A1 | 5/2014 |

OTHER PUBLICATIONS

PCT/US2015/047375 International Search Report and Written Opinion dated Nov. 24, 2015.
Office Action issued for related Japanese Application No. 2017-512378, dated Jul. 23, 2019 (7 pages).

*Primary Examiner* — Christopher P Jones
(74) *Attorney, Agent, or Firm* — Priya G. Prasad

(57) ABSTRACT

EMM-26 is a novel synthetic crystalline material having a single crystalline phase with a unique T-atom connectivity and X-ray diffraction pattern which identify it as a novel material. EMM-26 has a two-dimensional pore system defined by 10-membered rings of tetrahedrally coordinated atoms having pore dimensions of ~6.3 Å×~3.2 Å. EMM-26 may be prepared with a organic structure directing agent, such as 1,6-bis(N-methylpyrrolidinium) hexane dications and/or 1,6-bis(N-methylpiperidinium) hexane dications. EMM-26 may be used in organic compound conversion and/or sorptive processes.

6 Claims, 8 Drawing Sheets

EMM-26, A NOVEL SYNTHETIC CRYSTALLINE MATERIAL, ITS PREPARATION, AND ITS USE

CROSS-REFERENCE TO RELATED APPLICATIONS

This application claims the benefit of provisional U.S. Ser. No. 62/045,094, filed Sep. 3, 2014, the entire contents of which are expressly incorporated by reference herein.

FIELD OF THE INVENTION

This invention relates to a novel synthetic crystalline material, EMM-26, and to a method for its preparation. This invention also relates to the use of porous forms of EMM-26 in organic conversion and sorption processes.

BACKGROUND OF THE INVENTION

Zeolitic materials, both natural and synthetic, are known to have utility as sorbent materials and to have catalytic properties for various types of hydrocarbon conversion reactions. Certain zeolitic materials are ordered, porous crystalline metallosilicates having a definite crystalline structure as determined by X-ray diffraction, within which there are a large number of smaller cavities which may be interconnected by a number of still smaller channels or pores. These cavities and pores are uniform in size within a specific zeolitic material. Since the dimensions of these pores are such as to accept for sorption of molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates and substituted silicates, in which the silicon is partially or completely replaced by other tetravalent elements. These silicates can be described as a rigid three-dimensional framework of $SiO_4$ tetrahedra and optionally tetrahedra of a trivalent element oxide, e.g., $AlO_4$ and/or $BO_4$, in which the tetrahedra are cross-linked by the sharing of oxygen atoms whereby the local ratio of the total trivalent element and silicon atoms to oxygen atoms is ~1:~2. The electrovalence of the tetrahedra containing the trivalent element is balanced by the inclusion in the crystal of a cation, for example, an alkali metal or an alkaline earth metal cation. This can be expressed wherein the ratio of the trivalent element, e.g., aluminum, to the number of various cations, such as Ca/2, Sr/2, Na, K or Li, is approximately equal to unity. One type of cation may be exchanged either entirely or partially with another type of cation utilizing ion exchange techniques in a conventional manner. By means of such cation exchange, it has been possible to vary the properties of a given silicate by suitable selection of the cation.

Prior art techniques have resulted in the formation of a great variety of synthetic zeolites. Many of these zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886); zeolite ZSM-11 (U.S. Pat. No. 3,709,979); zeolite ZSM-12 (U.S. Pat. No. 3,832,449), zeolite ZSM-20 (U.S. Pat. No. 3,972,983); ZSM-35 (U.S. Pat. No. 4,016,245); zeolite ZSM-23 (U.S. Pat. No. 4,076,842); zeolite MCM-22 (U.S. Pat. No. 4,954,325); and zeolite MCM-35 (U.S. Pat. No. 4,981,663), to name merely a few.

There are currently over 200 known zeolitic framework structures recognized by the International Zeolite Association. There exists the need for new structures, having different properties than those of known materials, for improving the performance of many organic compound conversion and sorption processes. Each structure has unique pore, channel and cage dimensions, which gives its particular properties as described above. EMM-26 is a new synthetic crystalline material having a unique framework structure with a two-dimensional pore system defined by 10-membered rings of tetrahedrally coordinated atoms having pore dimensions of ~6.3 Å (±~0.4 Å)×~3.2 Å (±~0.3 Å). EMM-26 can have utility in organic compound conversion and/or sorption processes.

SUMMARY OF THE INVENTION

Accordingly, in one aspect, the invention resides in a novel synthetic crystalline material, EMM-26, which, in certain forms exhibits microporosity and having a unique framework of tetrahedral atoms (T) connected by bridging atoms. The tetrahedral atom framework of EMM-26 is defined by connecting the nearest tetrahedral (T) atoms in the manner shown in Table 1 below.

In one or more embodiments, the tetrahedral atom framework of EMM-26 may be defined by a unit cell with atomic coordinates in Angstrom listed in Table 2, wherein each coordinate position may vary within ±1 Angstrom.

In some embodiments, EMM-26 may be identified, at least in its as synthesized form, by an X-ray diffraction pattern including the lines listed in Table 3.

In one or more embodiments, EMM-26, in an as-synthesized form, can have a composition comprising, consisting essentially of, or being:

$a$Hal:$b$Q:$c$X$_2$O$_3$:YO$_2$:$z$H$_2$O, wherein Hal is a halide ion; Q is an organic structure directing agent selected from one or more of 1,6-bis(N-methylpyrrolidinium) hexane dications and 1,6-bis(N-methylpiperidinium) hexane dications, X is a trivalent element, Y is a tetravalent element, a is a number having a value equal to or greater than 0 to less than or equal to 0.2, b is a number having a value greater than 0 to less than or equal to 0.10, 0.015<c<0.125, and z is a number having a value greater than or equal to 0 to less than or equal to 0.15. In some embodiments, X can comprise boron and/or aluminum and Y can comprise silicon and/or germanium.

In other embodiments, EMM-26, in an as-synthesized form, can have a composition of:

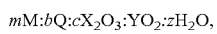
$m$M:$b$Q:$c$X$_2$O$_3$:YO$_2$:$z$H$_2$O, wherein M is an alkali or alkaline earth metal; Q is an organic structure directing agent selected from one or more of 1,6-bis(N-methylpyrrolidinium) hexane dications and 1,6-bis(N-methyl-piperidinium) hexane dications, X is a trivalent element, Y is a tetravalent element, m is a number having a value equal to or greater than 0 to less than or equal to 0.1, b is a number having a value greater than 0 to less than or equal to 0.10, 0.015<c<0.125, and z is a number having a value greater than or equal to 0 to less than or equal to 0.15. In some embodiments, X can comprise boron and/or aluminum and Y can comprise silicon and/or germanium.

In a further aspect, the invention resides in a process for producing EMM-26 comprising: providing a reaction mixture comprising sources of water, an oxide of a tetravalent element Y, an oxide of a trivalent element X, and a structure directing agent (Q) selected from one or more of 1,6-bis(N-methylpyrrolidinium) hexane dications and 1,6-bis(N-methyl-piperidinium) hexane dications; heating the reaction mixture at a temperature and for a time sufficient for crystals of EMM-26 to form; and optionally but preferably purifying and/or isolating EMM-26 crystal products from the reaction mixture.

In yet a further aspect, the invention resides in a process for separation of carbon dioxide from a mixture comprising carbon dioxide and one or more of an alkane, oxygen, nitrogen, $SO_x$, and $NO_x$, the process comprising contacting the mixture with a porous form of EMM-26 to selectively sorb said carbon dioxide, so as to form a product stream having a lower carbon dioxide content than that of the carbon dioxide mixture.

DETAILED DESCRIPTION OF THE EMBODIMENTS

Figure 1:
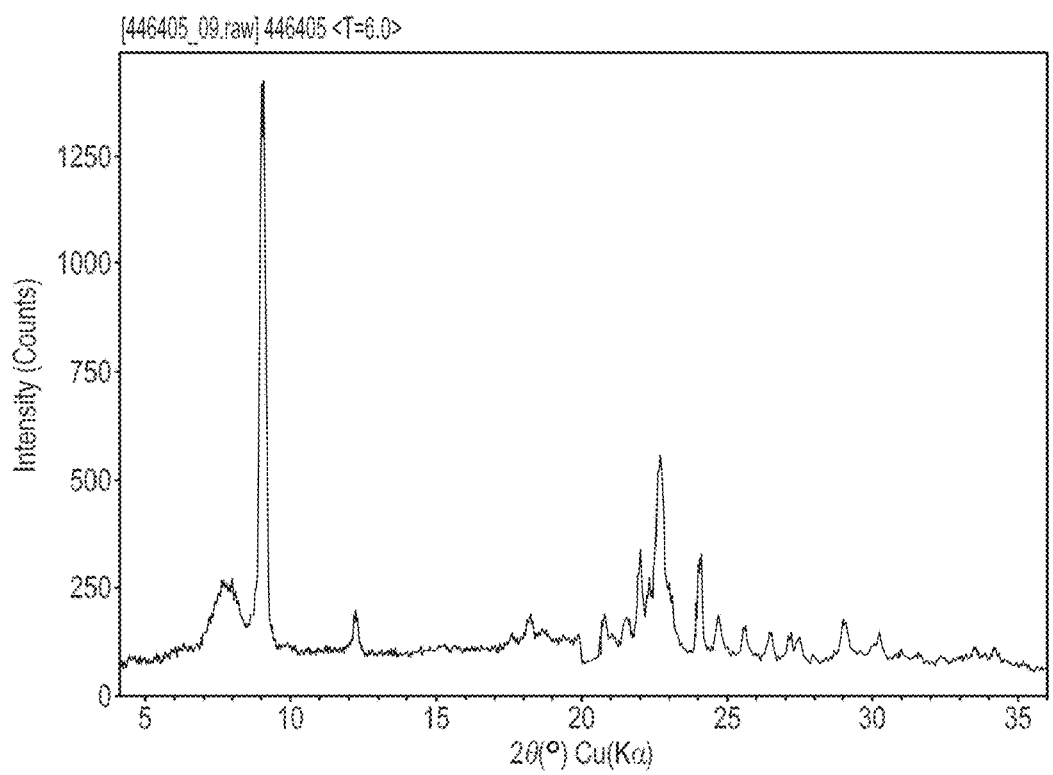
FIG. 1 shows the X-ray diffraction pattern of the product of Example 1.

EMM-26 is a new composition of matter having a unique crystalline framework structure with a two-dimensional pore system defined by 10-membered rings of tetrahedrally coordinated atoms having pore dimensions of ~6.3 Å×~3.2 Å. In certain forms, particularly its as-synthesized forms, the pores of EMM-26 may be partially or completely blocked by extra-framework material. In its porous forms, EMM-26 can have utility in organic compound conversion and/or sorption processes.

The unique crystalline structure of EMM-26 can, in come embodiments, be defined by the connectivity between the tetrahedrally-coordinated atoms in each unit cell. In particular, each unit cell of EMM-26 can have a framework of tetrahedral (T) atoms connected by bridging atoms, wherein the tetrahedral atom framework can be defined by connecting the nearest tetrahedral (T) atoms in the manner shown in Table 1 below.

TABLE 1

| | |
|---|---|
| T1 | T2, T45, T47, T95 |
| T2 | T1, T20, T29, T42 |
| T3 | T42, T45, T88, T94 |
| T4 | T5, T8, T20, T34 |
| T5 | T4, T6, T17, T18 |
| T6 | T5, T7, T63, T65 |
| T7 | T6, T15, T28, T39 |
| T8 | T4, T39, T63, T72 |
| T9 | T10, T13, T32, T59 |
| T10 | T9, T11, T24, T57 |
| T11 | T10, T12, T55, T58 |
| T12 | T11, T22, T30, T40 |
| T13 | T9, T40, T55, T78 |
| T14 | T15, T19, T31, T95 |
| T15 | T7, T14, T16, T94 |
| T16 | T15, T17, T76, T78 |
| T17 | T5, T16, T29, T39 |
| T18 | T5, T20, T34, T96 |
| T19 | T14, T39, T58, T76 |
| T20 | T2, T4, T18, T26 |
| T21 | T22, T25, T33, T90 |
| T22 | T12, T21, T23, T89 |
| T23 | T22, T24, T70, T72 |
| T24 | T10, T23, T27, T40 |
| T25 | T21, T40, T65, T70 |
| T26 | T20, T60, T81, T83 |
| T27 | T24, T48, T67, T92 |
| T28 | T7, T60, T61, T79 |
| T29 | T2, T17, T43, T74 |
| T30 | T12, T53, T69, T84 |
| T31 | T14, T46, T77, T94 |
| T32 | T9, T56, T57, T87 |
| T33 | T21, T51, T71, T89 |
| T34 | T4, T18, T64, T82 |
| T35 | T56, T58, T71, T72 |
| T36 | T64, T65, T77, T78 |
| T37 | T46, T47, T82, T83 |
| T38 | T51, T52, T87, T88 |
| T39 | T7, T8, T17, T19 |
| T40 | T12, T13, T24, T25 |
| T41 | T69, T73, T92, T93 |
| T42 | T2, T3, T60, T96 |
| T43 | T29, T44, T47, T75 |
| T44 | T43, T45, T74, T82 |
| T45 | T1, T3, T44, T46 |
| T46 | T31, T37, T45, T80 |
| T47 | T1, T37, T43, T73 |
| T48 | T27, T49, T52, T68 |
| T49 | T48, T50, T67, T87 |
| T50 | T49, T51, T91, T93 |
| T51 | T33, T38, T50, T85 |
| T52 | T38, T48, T91, T96 |
| T53 | T30, T54, T58, T85 |
| T54 | T53, T55, T71, T84 |
| T55 | T11, T13, T54, T56 |
| T56 | T32, T35, T55, T68 |
| T57 | T10, T32, T59, T73 |
| T58 | T11, T19, T35, T53 |
| T59 | T9, T57, T66, T92 |
| T60 | T26, T28, T42, T95 |
| T61 | T28, T62, T65, T80 |
| T62 | T61, T63, T77, T79 |
| T63 | T6, T8, T62, T64 |
| T64 | T34, T36, T63, T75 |
| T65 | T6, T25, T36, T61 |
| T66 | T59, T69, T86, T88 |
| T67 | T27, T49, T68, T72 |
| T68 | T48, T56, T67, T70 |
| T69 | T30, T41, T66, T90 |
| T70 | T23, T25, T68, T71 |
| T71 | T33, T35, T54, T70 |
| T72 | T8, T23, T35, T67 |
| T73 | T41, T47, T57, T86 |
| T74 | T29, T44, T75, T78 |
| T75 | T43, T64, T74, T76 |
| T76 | T16, T19, T75, T77 |
| T77 | T31, T36, T62, T76 |
| T78 | T13, T16, T36, T74 |
| T79 | T28, T62, T80, T83 |
| T80 | T46, T61, T79, T81 |

TABLE 1-continued

| | |
|---|---|
| T81 | T26, T80, T82, T96 |
| T82 | T34, T37, T44, T81 |
| T83 | T26, T37, T79, T93 |
| T84 | T30, T54, T85, T88 |
| T85 | T51, T53, T84, T86 |
| T86 | T66, T73, T85, T87 |
| T87 | T32, T38, T49, T86 |
| T88 | T3, T38, T66, T84 |
| T89 | T22, T33, T90, T93 |
| T90 | T21, T69, T89, T91 |
| T91 | T50, T52, T90, T92 |
| T92 | T27, T41, T59, T91 |
| T93 | T41, T50, T83, T89 |
| T94 | T3, T15, T31, T95 |
| T95 | T1, T14, T60, T94 |
| T96 | T18, T42, T52, T81 |

Tetrahedrally-coordinated atoms are those capable of having tetrahedral coordination, including one or more of, but not limited to, boron (B), lithium (Li), beryllium (Be), aluminum (Al), phosphorous (P), silicon (Si), gallium (Ga), germanium (Ge), zinc (Zn), chromium (Cr), magnesium (Mg), iron (Fe), cobalt (Co), nickel (Ni), manganese (Mn), arsenic (As), indium (In), copper (Cu), tin (Sn), antimony (Sb), titanium (Ti), and zirconium (Zr). Bridging atoms are those capable of connecting two tetrahedrally-coordinated atoms, examples including one or more of, but not limited to, oxygen (O), nitrogen (N), fluorine (F), sulfur (S), selenium (Se), and carbon (C). Preferred tetrahedral atoms in the framework of EMM-26 can include one or more elements selected from the group consisting of B, Al, Si, and Ge.

The complete structure of EMM-26 can be built by connecting multiple unit cells as defined above in a fully-connected three-dimensional framework. The tetrahedrally-coordinated atoms in one unit cell can be connected to certain tetrahedrally-coordinated atoms in all of its adjacent unit cells. While Table 1 lists the connections of all the tetrahedrally-coordinated atoms for a given unit cell of EMM-26, the connections may not be to the particular atom in the same unit cell but to an adjacent unit cell. All of the connections listed in Table 1 can be provided such that they are to the closest tetrahedrally-coordinated atoms, irrespective of whether they are in the same unit cell or in adjacent unit cells.

The structure of EMM-26 may additionally or alternatively be defined by the x, y, and z (Cartesian) coordinates of the position of each tetrahedrally-coordinated atom in the unit cell. In such a construct, each tetrahedrally-coordinated atom can be bonded to bridging atoms, which in turn can be bonded to adjacent tetrahedrally-coordinated atoms. Since tetrahedrally-coordinated atoms may move about due to other crystal forces (due to the presence of inorganic or organic species, for example), and/or due to choices of tetrahedrally-coordinated and/or bridging atoms, a range of ±1.0 Angstroms has been implied herein for the reported x, y, and z coordinate positions. The approximate x, y, and z coordinate positions of tetrahedrally-coordinated atoms (T-atoms) for the EMM-26 in units of Angstroms that are typical when T=silicon and the bridging atoms are oxygen are listed in Table 2 below.

TABLE 2

| Atom | x | y | z |
|---|---|---|---|
| T1 | 3.33 | 12.33 | 8.89 |
| T2 | 4.38 | 14.44 | 7.13 |
| T3 | 8.05 | 13.40 | 10.15 |
| T4 | 3.16 | 2.73 | 3.69 |
| T5 | 5.89 | 1.71 | 2.53 |
| T6 | 6.29 | 3.34 | 0.01 |
| T7 | 5.24 | 1.23 | 16.01 |
| T8 | 1.57 | 2.27 | 1.27 |
| T9 | 12.78 | 10.56 | 3.69 |
| T10 | 15.5 | 19.55 | 2.53 |
| T11 | 15.91 | 11.18 | 0.01 |
| T12 | 14.86 | 9.07 | 16.01 |
| T13 | 11.19 | 10.11 | 1.27 |
| T14 | 3.16 | 12.95 | 14.08 |
| T15 | 5.89 | 13.96 | 15.24 |
| T16 | 6.29 | 12.33 | 17.76 |
| T17 | 5.24 | 14.44 | 1.76 |
| T18 | 6.46 | 2.73 | 5.20 |
| T19 | 1.57 | 13.40 | 16.50 |
| T20 | 3.73 | 1.71 | 6.36 |
| T21 | 12.78 | 5.11 | 14.08 |
| T22 | 15.51 | 6.12 | 15.24 |
| T23 | 15.91 | 4.50 | 17.76 |
| T24 | 14.86 | 6.60 | 1.76 |
| T25 | 11.19 | 5.57 | 16.50 |
| T26 | 3.33 | 3.34 | 8.88 |
| T27 | 14.43 | 5.12 | 4.44 |
| T28 | 4.81 | 2.71 | 13.33 |
| T29 | 4.81 | 12.96 | 4.44 |
| T30 | 14.43 | 10.55 | 13.33 |
| T31 | 4.81 | 10.55 | 13.33 |
| T32 | 14.43 | 12.96 | 4.44 |
| T33 | 14.43 | 2.71 | 13.33 |
| T34 | 4.81 | 5.12 | 4.44 |
| T35 | 16.16 | 0.00 | 0.00 |
| T36 | 6.54 | 7.84 | 0.00 |
| T37 | 3.08 | 7.84 | 8.88 |
| T38 | 12.70 | 0.00 | 8.88 |
| T39 | 3.08 | 0.00 | 0.00 |
| T40 | 12.70 | 7.84 | 0.00 |
| T41 | 16.16 | 7.84 | 8.88 |
| T42 | 6.54 | 0.00 | 8.88 |
| T43 | 3.16 | 10.56 | 5.20 |
| T44 | 5.89 | 9.55 | 6.36 |
| T45 | 6.29 | 11.18 | 8.88 |
| T46 | 5.24 | 9.07 | 10.64 |
| T47 | 1.57 | 10.11 | 7.62 |
| T48 | 12.78 | 2.73 | 5.20 |
| T49 | 15.51 | 1.71 | 6.36 |
| T50 | 15.91 | 3.34 | 8.88 |
| T51 | 14.86 | 1.23 | 10.64 |
| T52 | 11.19 | 2.27 | 7.62 |
| T53 | 16.08 | 12.95 | 14.08 |
| T54 | 13.35 | 13.96 | 15.24 |
| T55 | 12.95 | 12.33 | 17.76 |
| T56 | 14.00 | 14.44 | 1.76 |
| T57 | 16.08 | 10.56 | 5.20 |
| T58 | 17.67 | 13.40 | 16.50 |
| T59 | 13.35 | 9.55 | 6.36 |
| T60 | 4.38 | 1.23 | 10.64 |
| T61 | 6.46 | 5.11 | 14.08 |
| T62 | 3.73 | 6.12 | 15.24 |
| T63 | 3.33 | 4.50 | 17.76 |
| T64 | 4.38 | 6.60 | 1.76 |
| T65 | 8.05 | 5.57 | 16.50 |
| T66 | 12.95 | 11.18 | 8.88 |
| T67 | 16.08 | 2.73 | 3.69 |
| T68 | 13.35 | 1.71 | 2.53 |
| T69 | 14.00 | 9.07 | 10.64 |
| T70 | 12.95 | 3.34 | 0.01 |
| T71 | 14.00 | 1.23 | 16.01 |
| T72 | 17.67 | 2.27 | 1.27 |
| T73 | 17.67 | 10.11 | 7.62 |
| T74 | 6.46 | 10.56 | 3.69 |
| T75 | 3.73 | 9.55 | 2.53 |
| T76 | 3.33 | 11.18 | 0.01 |
| T77 | 4.38 | 9.07 | 16.01 |
| T78 | 8.05 | 10.11 | 1.27 |
| T79 | 3.16 | 5.11 | 12.57 |
| T80 | 5.89 | 6.12 | 11.41 |
| T81 | 6.29 | 4.50 | 8.89 |

TABLE 2-continued

| Atom | x | y | z |
|---|---|---|---|
| T82 | 5.24 | 6.60 | 7.13 |
| T83 | 1.57 | 5.57 | 10.15 |
| T84 | 12.78 | 12.95 | 12.57 |
| T85 | 15.51 | 13.96 | 11.41 |
| T86 | 15.91 | 12.33 | 8.89 |
| T87 | 14.86 | 14.44 | 7.13 |
| T88 | 11.19 | 13.40 | 10.15 |
| T89 | 16.08 | 5.11 | 12.57 |
| T90 | 13.35 | 6.12 | 11.41 |
| T91 | 12.95 | 4.50 | 8.89 |
| T92 | 14.00 | 6.60 | 7.13 |
| T93 | 17.67 | 5.57 | 10.15 |
| T94 | 6.46 | 12.95 | 12.57 |
| T95 | 3.73 | 13.96 | 11.41 |
| T96 | 8.05 | 2.27 | 7.62 |

The as-synthesized and calcined forms of EMM-26 can have characteristic X-ray diffraction (XRD) patterns, the essential reflection lines of which may be represented in Table 3 (as synthesized form) and Table 4 (calcined form). Variations can occur as a function of the specific composition and its loading in the structure. For this reason, the relative intensities and d-spacings are represented as ranges in Tables 3 and 4.

TABLE 3

| d (Å) | Relative intensity |
|---|---|
| 10.0-9.5 | 60-100 |
| 7.32-7.08 | 5-30 |
| 4.93-4.83 | 1-20 |
| 4.30-4.22 | 10-40 |
| 4.22-4.15 | 10-40 |
| 4.18-4.11 | 5-30 |
| 4.07-3.99 | 20-70 |
| 4.01-3.94 | 20-70 |
| 3.97-3.90 | 5-30 |
| 3.906-3.839 | 10-40 |
| 3.883-3.817 | 5-30 |
| 3.735-3.674 | 10-40 |
| 3.630-3.572 | 10-40 |
| 3.395-3.345 | 5-30 |
| 3.303-3.255 | 5-30 |
| 3.129-3.087 | 1-20 |
| 3.098-3.056 | 5-30 |
| 2.968-2.930 | 1-20 |
| 1.944-1.928 | 1-20 |

TABLE 4

| d (Å) | Relative intensity |
|---|---|
| 9.8-9.0 | 60-100 |
| 8.75-9.15 | 5-30 |
| 7.00-7.40 | 10-40 |
| 5.60-5.80 | 3-15 |
| 5.25-5.38 | 8-20 |
| 4.14-4.24 | 5-20 |
| 3.88-3.96 | 25-70 |
| 3.55-3.63 | 20-60 |
| 3.30-3.38 | 10-25 |
| 3.02-3.10 | 2-10 |

The XRD patterns in Tables 3 and 4 were measured with Cu Kα radiation using a PANalytical X'Pert diffactometer with a X'celerator detector, Bragg-Brentano geometry, ~45 kV and ~40 mA tube voltage and current, ~1/8° fixed divergence slit and anti-scatter slits, ~0.04 radian Soller slits, and ~0.017° step size.

In one or more embodiments, EMM-26, in an as-synthesized form, can have a composition of:

$$aHal:bQ:cX_2O_3:YO_2:zH_2O,$$

wherein Hal is a halide ion; such as a chloride or fluoride ion; Q is an organic structure directing agent selected from one or more of 1,6-bis(N-methylpyrrolidinium)hexane dications and 1,6-bis(N-methylpiperidinium)hexane dications, X is a trivalent element, Y is a tetravalent element, a is a number having a value equal to or greater than 0 to less than or equal to 0.2, b is a number having a value greater than 0 to less than or equal to 0.10, 0.015<c<0.125, and z is a number having a value greater than or equal to 0 to less than or equal to 0.15. In some embodiments, X can comprise boron and/or aluminum and Y can comprise silicon and/or germanium.

In additional or alternative embodiments, EMM-26, in an as-synthesized form, can have a composition of:

$$mM:bQ:cX_2O_3:YO_2:zH_2O,$$

wherein M is an alkali or alkaline earth metal; Q is an organic structure directing agent selected from one or more of 1,6-bis(N-methylpyrrolidinium) hexane dications and 1,6-bis(N-methyl-piperidinium) hexane dications, X is a trivalent element, Y is a tetravalent element, m is a number having a value equal to or greater than 0 to less than or equal to 0.1, b is a number having a value greater than 0 to less than or equal to 0.10, 0.015<c<0.125, and z is a number having a value greater than or equal to 0 to less than or equal to 0.15. In some embodiments, X can comprise boron and/or aluminum and Y can comprise silicon and/or germanium.

Of the above organic structure directing agents, the 1,6-bis(N-methyl-pyrrolidinium) hexane dication has the following structural formula:

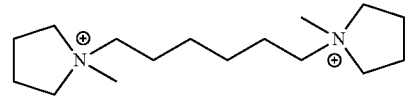 [SMILES: C[N+]1(CCCCCC[N+]2(C)CCCC2)CCCC1]

and the 1,6-bis(N-methylpiperidinium) hexane dication has the following structural formula:

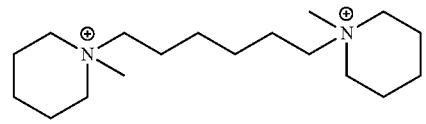 [SMILES: C[N+]1(CCCCCC[N+]2(C)CCCCC2)CCCCC1]

The above diquaternary ammonium compounds can readily be synthesized by reaction of N-methylpyrrolidine and N-methylpiperidine, respectively, with 1,6-dibromohexane using known techniques.

The new crystalline material EMM-26 can be prepared from a reaction mixture comprising sources of water, an oxide of a tetravalent element Y, preferably silicon and/or germanium, an oxide of a trivalent element X, preferably boron and/or aluminum, and a structure directing agent (Q) selected from one or more of 1,6-bis(N-methylpyrrolidinium) hexane dications and 1,6-bis(N-methylpiperidinium) hexane dications.

Suitable sources of the tetravalent element Y can depend on the element Y selected and, in preferred embodiments, in which Y comprises or is silicon and/or germanium, can include colloidal suspensions of silica, fumed silicas, precipitated silicas, alkali metal silicates, tetraalkyl orthosilicates, germanium oxide, or the like, or a combination thereof. Suitable sources of the trivalent element X can similarly be dependent on the element selected and, where X comprises or is boron and/or aluminum, can include boric acid and water-soluble boric acid salts, hydrated alumina and water-soluble aluminum salts, such as aluminum nitrate, and the like, and combinations thereof. Combined sources of X and Y can additionally or alternatively be used and can include, for example, aluminosilicate zeolites, such as zeolite Y, and clays or treated clays, such as metakaolin.

Suitable sources of Q are the hydroxides, chlorides, bromides, and/or other salts of the relevant diquaternary ammonium compounds.

In some embodiments, the reaction mixture may include one or more sources of halide (Hal) ions, preferably chloride and/or fluoride ions when present. In such embodiments, the reaction mixture may have a composition, in terms of mole ratios of oxides, within the following ranges:

| Reactants | Useful | Preferred |
|---|---|---|
| $X_2O_3/YO_2$ | ~0.015 to ~0.125 | ~0.02 to ~0.025 |
| $H_2O/YO_2$ | ~1 to ~80 | ~5 to ~40 |
| $Hal/YO_2$ | ~0 to ~1.0 | ~0.15 to ~0.5 |
| $Q/YO_2$ | ~0.05 to ~0.5 | ~0.1 to ~0.3. |

In some embodiments, the reaction mixture may include one or more sources of hydroxide ions. In such embodiments, the reaction mixture may have a composition, in terms of mole ratios of oxides, within the following ranges:

| Reactants | Useful | Preferred |
|---|---|---|
| $X_2O_3/YO_2$ | ≤~0.125 | ~0.05 to ~0.1 |
| $H_2O/YO_2$ | ~10 to ~80 | ~15 to ~40 |
| $OH^-/YO_2$ | ~0.1 to ~1.0 | ~0.2 to ~0.5 |
| $Q/YO_2$ | ~0.03 to ~0.6 | ~0.05 to ~0.25 |

The reaction mixture may also contain seeds of a crystalline material, such as EMM-26, from a previous synthesis, desirably in an amount from about 0.01 ppm by weight to about 10,000 ppm by weight, such as from about 100 ppm by weight to about 5,000 ppm by weight, of the reaction mixture.

Crystallization of EMM-26 from the above synthesis mixture can be carried out at either static or stirred conditions in a suitable reactor vessel, such as for example, polypropylene jars or teflon lined or stainless steel autoclaves, at a temperature from about 100° C. to about 200° C., such as from about 130° C. to about 180° C., for a time sufficient for crystallization to occur at the temperature used, e.g., from about 2 hours to about 168 hours or from about 5 days to about 40 days. Thereafter, the crystals can be separated from the liquid/mixture and recovered.

The as-synthesized EMM-26 produced by the present process may be subjected to subsequent treatment to remove part or all of the organic directing agent Q used in its synthesis. This can be conveniently effected by thermal treatment in which the as-synthesized material can be heated at a temperature of at least about 370° C. for at least ~1 minute and generally not longer than about 24 hours. While subatmospheric and/or superatmospheric pressures can be employed for the thermal treatment, atmospheric pressure can typically be desired for reasons of convenience. The thermal treatment can be performed at a temperature up to about 925° C. Additionally or alternatively, the organic directing agent Q can be removed by treatment with ozone (see, e.g., Parikh et al., *Microporous and Mesoporous Materials* 76 (2004) 17-22).

To the extent desired and depending on the $X_2O_3/YO_2$ molar ratio of the material, any alkali or alkaline earth metal cations in the as-synthesized EMM-26 can be replaced in accordance with techniques well known in the art by ion exchange with other cations. Preferred replacing cations can include metal ions, hydrogen ions, hydrogen precursor, e.g., ammonium ions, and mixtures thereof. Particularly preferred cations can include those which tailor the catalytic activity for certain hydrocarbon conversion reactions. These can include, but may not be limited to, hydrogen, rare earth metals, and metals of Groups 2 to 15 of the Periodic Table of the Elements. As used herein, the numbering scheme for the Periodic Table Groups is as disclosed in *Chemical and Engineering News*, 63(5), 27 (1985).

The present inventive product may be intimately combined with a hydrogenating component, such as molybdenum, rhenium, nickel, cobalt, chromium, manganese, and/or a noble metal such as platinum or palladium, where a hydrogenation-dehydrogenation function may be performed. Such component can be in the composition by way of cocrystallization, exchanged into the composition to the extent a trivalent element X, e.g., aluminum, is in the structure, impregnated therein, intimately physically admixed therewith, or via any suitable method known to those in the art. Such component can be impregnated in/on to the product catalyst composition such as, for example, in the case of platinum, by treating the silicate with a solution containing a platinum metal-containing ion. Thus, suitable platinum compounds for this purpose include chloroplatinic acid, platinous chloride, and various compounds containing the platinum amine complex.

The present crystalline material, when employed as a sorbent and/or as a catalyst, should typically be dehydrated, at least partially. This can be done by heating to a temperature in the range of about 200° C. to about 370° C. in an atmosphere such as air, nitrogen, etc., and at atmospheric, subatmospheric, or superatmospheric pressures for between about 30 minutes and about 48 hours. Dehydration can additionally or alternately be performed at room temperature (~20-25° C.) merely by placing the EMM-26 in a vacuum, but longer times may be required to obtain a sufficient amount of dehydration.

The EMM-26 described herein can be used as a sorbent, for example, in the separation of carbon dioxide from a mixture comprising carbon dioxide and one or more alkanes, such as methane, ethane, propane, and/or butane, and/or a mixture comprising carbon dioxide and oxygen, nitrogen, $H_2S$, $SO_x$, and/or $NO_x$. The separation process can employ the equilibrium selectivity of EMM-26, the kinetic selectivity of EMM-26, or both the equilibrium and kinetic selectivity of EMM-26, for carbon dioxide over the other component(s) of the mixture. In particular, EMM-26 materials having a $B_2O_3$ to $SiO_2$ molar ratio from about 0.125 to about 0.033 can typically possess a sorption capacity for $CO_2$ at ~1 atm (~100 kPa) from about 0.8 mmol/g to about 2.0 mmol/g. Alternatively or in addition, and particularly in its aluminosilicate form, EMM-26 can be used as a catalyst to facilitate one or more organic compound conversion processes including many of present commercial/industrial importance.

As in the case of many catalysts used in organic compound (hydrocarbon) conversion processes, it may be desirable to incorporate the present EMM-26 with another material resistant to the temperatures and other conditions employed in organic conversion processes. Such materials can include active and inactive materials and synthetic or naturally occurring zeolites, as well as inorganic materials such as clays, silica, and/or metal oxides such as alumina.

The latter may be either naturally occurring or in the form of gelatinous precipitates or gels, including mixtures of silica and metal oxides. Use of a material in conjunction with the present EMM-26, i.e., combined therewith and/or present during synthesis of the new crystal, which is active, can tend to change the conversion and/or selectivity of the catalyst in certain organic conversion processes. Inactive materials can suitably serve as diluents to control the amount of conversion in a given process so that products can be obtained in an economic and orderly manner without employing other (more costly) means for controlling the rate of reaction. These materials may be incorporated into naturally occurring clays, e.g., bentonite and kaolin, to improve the crush strength of the catalyst under commercial operating conditions. Said materials, i.e., clays, oxides, etc., can function as binders for the catalyst. It can be desirable to provide a catalyst having good crush strength, because in commercial use it can be desirable to prevent the catalyst from breaking down into powder-like materials (attrition). These clay and/or oxide binders have been employed normally only for the purpose of improving the crush strength of the catalyst.

Naturally occurring clays which can be composited with the present EMM-26 can include, without limitation, the montmorillonite and kaolin family, which families include the subbentonites, and the kaolins commonly known as Dixie, McNamee, Georgia, and Florida clays, or others in which the main mineral constituent is halloysite, kaolinite, dickite, nacrite, or anauxite. Such clays can be used in the raw state as originally mined or initially subjected to calcination, acid treatment, or chemical modification. Binders useful for compositing with EMM-26 can additionally or alternatively include inorganic oxides, such as silica, zirconia, titania, magnesia, beryllia, alumina, and mixtures thereof.

Alternatively or in addition to the foregoing materials, the present EMM-26 can be composited with a porous matrix material such as silica-alumina, silica-magnesia, silica-zirconia, silica-thoria, silica-beryllia, silica-titania, and/or one or more ternary compositions such as silica-alumina-thoria, silica-alumina-zirconia silica-alumina-magnesia, and silica-magnesia-zirconia.

The relative proportions of EMM-26 and inorganic oxide matrix may vary widely, with the EMM-26 content ranging from about 1 wt % to about 90 wt %, and, more usually, particularly when the composite is prepared in the form of beads, in the range of about 2 wt % to about 80 wt % of the composite. An exemplary matrix content range can include from about 10 wt % to about 50 wt %.

Additionally or alternatively, the invention can advantageously include one or more of the following embodiments.

Embodiment 1. A synthetic crystalline material having a framework of tetrahedral atoms (T) connected by bridging atoms, the tetrahedral atom framework being defined by connecting the nearest tetrahedral (T) atoms in the manner shown in Table 1.

Embodiment 2. A synthetic crystalline material having a framework of tetrahedral atoms (T) connected by bridging atoms, the tetrahedral atom framework being defined by a unit cell with atomic coordinates in Angstrom listed in Table 2, wherein each coordinate position may vary within +1 Angstrom.

Embodiment 3. A synthetic porous crystalline material including, in its as-calcined form, an X-ray diffraction pattern including the d-spacings and relative intensities listed in Table 4.

Embodiment 4. A synthetic porous crystalline material including, in its as-synthesized form, an X-ray diffraction pattern including the d-spacings and relative intensities listed in Table 3.

Embodiment 5. The crystalline material of any one of the previous embodiments, wherein the tetrahedral atoms include one or more elements selected from the group consisting of Li, Be, B, Al, P, Si, Ga, Ge, Zn, Cr, Mg, Fe, Co, Ni, Cu, Mn, As, In, Sn, Sb, Ti, and Zr, for example one or more elements selected from the group consisting of B, Al, and Si.

Embodiment 6. The crystalline material of any one of the previous embodiments, wherein the bridging atoms include one or more elements selected from the group consisting of O, N, F, S, Se, and C, for example include oxygen.

Embodiment 7. The crystalline material of any one of embodiments 1-2 and 4-6, having the following composition: $aHal:bQ:cX_2O_3:YO_2:zH_2O$, wherein Hal is a halide ion; Q is an organic structure directing agent selected from one or more of 1,6-bis(N-methyl-pyrrolidinium) hexane dications and 1,6-bis(N-methylpiperidinium) hexane dications, X is a trivalent element, Y is a tetravalent element, a is a number having a value equal to or greater than 0 to less than or equal to 0.2, b is a number having a value greater than 0 to less than or equal to 0.10, $0.015 < c < 0.125$, and z is a number having a value greater than or equal to 0 to less than or equal to 0.15.

Embodiment 8. The crystalline material of any one of embodiments 1-2 and 4-6, having the following composition: $mM:bQ:cX_2O_3:YO_2:zH_2O$, wherein M is an alkali or alkaline earth metal; Q is an organic structure directing agent selected from one or more of 1,6-bis(N-methylpyrrolidinium) hexane dications and 1,6-bis(N-methylpiperidinium) hexane dications, X is a trivalent element, Y is a tetravalent element, m is a number having a value equal to or greater than 0 to less than or equal to 0.1, b is a number having a value greater than 0 to less than or equal to 0.10, $0.015 < c < 0.125$, and z is a number having a value greater than or equal to 0 to less than or equal to 0.15.

Embodiment 9. The crystalline material of embodiment 7 or embodiment 8, wherein X comprises boron and Y comprises silicon, optionally having a $B_2O_3$ to $SiO_2$ molar ratio from about 0.125 to about 0.033 and optionally having a sorption capacity for $CO_2$ at about 1 atm (about 100 kPa) from about 0.8 mmol/g to about 2.0 mmol/g.

Embodiment 10. A process for preparing the crystalline material independently, or according of any one the preceding embodiments, the method comprising the steps of: (a) providing a reaction mixture comprising sources of water, an oxide of a tetravalent element Y, an oxide of a trivalent element X, optionally a source of halide ions, optionally a source of hydroxide ions, and a structure directing agent (Q) selected from one or more of 1,6-bis(N-methylpyrrolidinium) hexane dications and 1,6-bis(N-methylpiperidinium) hexane dications; (b) heating the reaction mixture under crystallization conditions including a temperature of from 100° C. to 200° C. until crystals of the crystalline material are formed; (c) recovering crystals produced in (b); and optionally (d) treating the crystals recovered in (c) to remove at least part of the structure directing agent (Q).

Embodiment 11. A synthetic porous crystalline material produced by the process of embodiment 10.

Embodiment 12. A process for separation of carbon dioxide from a mixture comprising carbon dioxide and one or more of an alkane, oxygen, nitrogen, $H_2S$, $SO_x$ and $NO_x$, the process comprising contacting the mixture with the porous crystalline material of any one or more of embodiments 1-9 and 11.

Embodiment 13. A process for separation of carbon dioxide from a mixture comprising carbon dioxide and methane, the process contacting the mixture with the porous crystalline material of any one or more of embodiments 1-9 and 11.

The invention will now be more particularly described with reference to the following Examples and the accompanying drawings.

EXAMPLES

Example 1

A reaction mixture was prepared in a sealed ~1.5-mL stainless steel reactor vessel with the following mole ratios using boric acid as the boron source, Ludox AS-40™ as the silica source, HCl as a source of halide ions, and 1,6-bis(N-methylpyrrolidinium)hexane hydroxide as the structure directing agent Q: Q/Si≈0.2; Si/B≈5; HCl/Si≈0.10; and $H_2O$/Si≈35.

Figure 2:
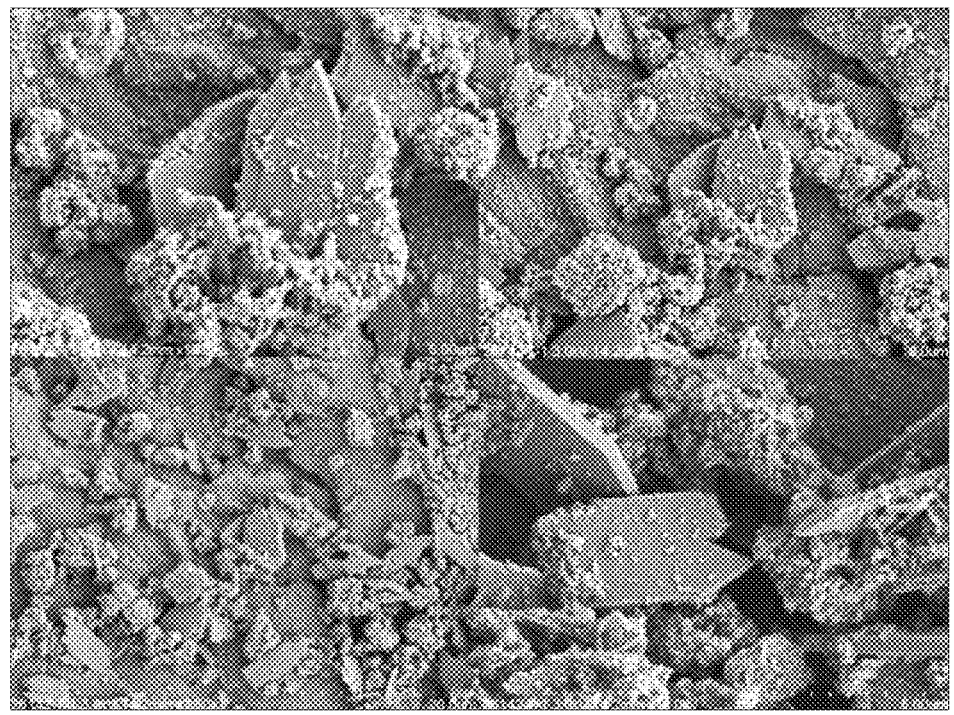
FIG. 2 shows scanning electron micrograph (SEM) images of the product of Example 1.

The reaction mixture was heated in a convection oven under tumbling conditions (about 30 rpm) for ~56 days at ~160° C. The sample was worked up by a series of three centrifugations, decantations, re-suspensions, and washings with deionized water. Powder XRD of the product gave the pattern of FIG. 1 and showed the product to be a mixture of a new phase, EMM-26, with amorphous material and a minor amount of zeolite beta impurity. FIG. 2 provides SEM images of this product and shows that product appeared to comprise large crystals around 5 microns in length, ~1-2 microns wide, and about 0.3 microns in thickness.

Example 2

Figure 3:
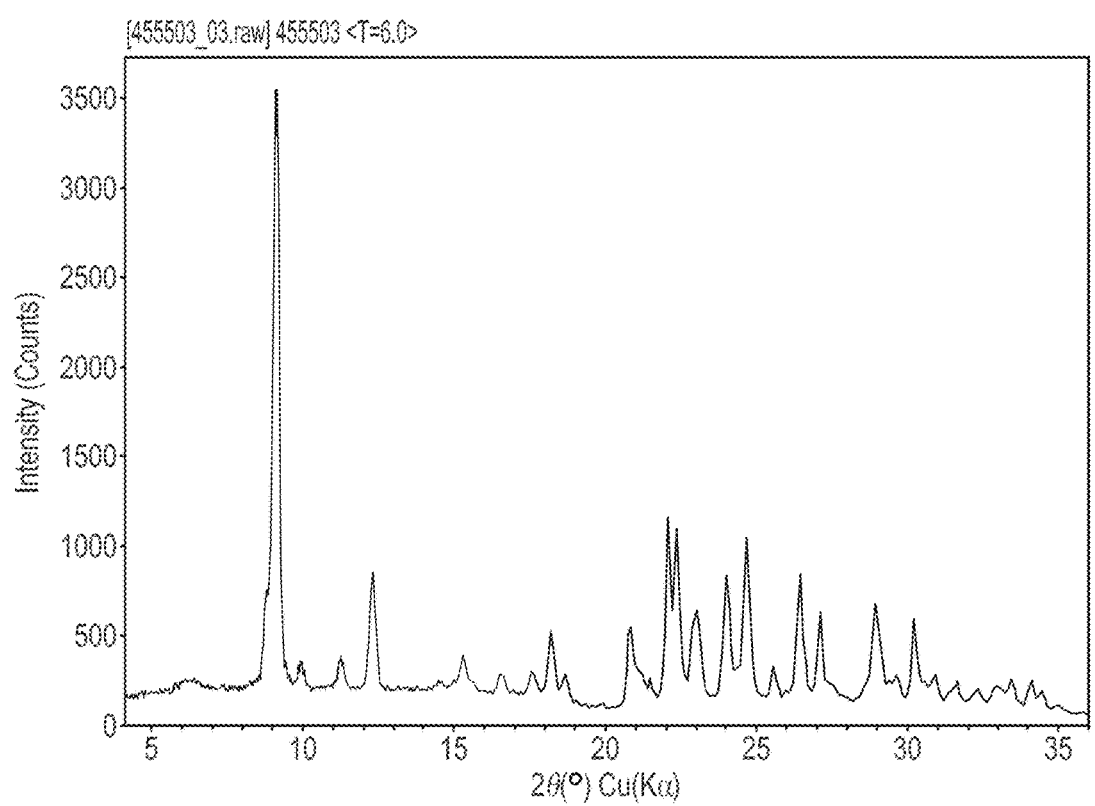
FIG. 3 shows the X-ray diffraction pattern of the product of Example 2.

Example 1 was repeated except that 1,6-bis(N-methylpiperidinium)hexane hydroxide was used as the structure directing agent Q, no HCl was added to the reaction mixture, and the reaction mixture was heated for ~28 days. Powder XRD of the product (FIG. 3) showed the product to be a pure form of the new phase, EMM-26, observed in Example 1. The powder XRD pattern could be indexed on a C-centered orthorhombic cell with a≈19.43, b≈15.75, and c≈17.85 Å.

Example 3

About 1.67 grams of a solution of 1,6-bis(N-methylpyrrolidinium) hexane hydroxide (~25.8 wt %) was mixed with ~5.39 grams deionized water inside a Teflon liner for a ~23-mL steel Parr autoclave. Next about 0.19 grams boric acid was added to the solution and mixed until nearly complete dissolution. Then ~2.25 g Ludox AS-40™ was added to the mixture, and ~1.50 grams of ~1N HCl was added and mixed to create a relatively uniform suspension having the following molar composition: Q/Si≈0.1; Si/B≈5; HCl/Si≈0.10; and $H_2O$/Si≈35.

About 0.04 grams of seeds of the product from Example 1 were added to the suspension, and the liner was then capped, sealed inside the ~23-mL autoclave, and heated at ~160° C. under tumbling conditions (about 40 rpm). The reactor was removed after ~14 days, quenched, and the solids were isolated by filtration, washed exhaustively with deionized water, dried, and analyzed with powder XRD.

Figure 4:
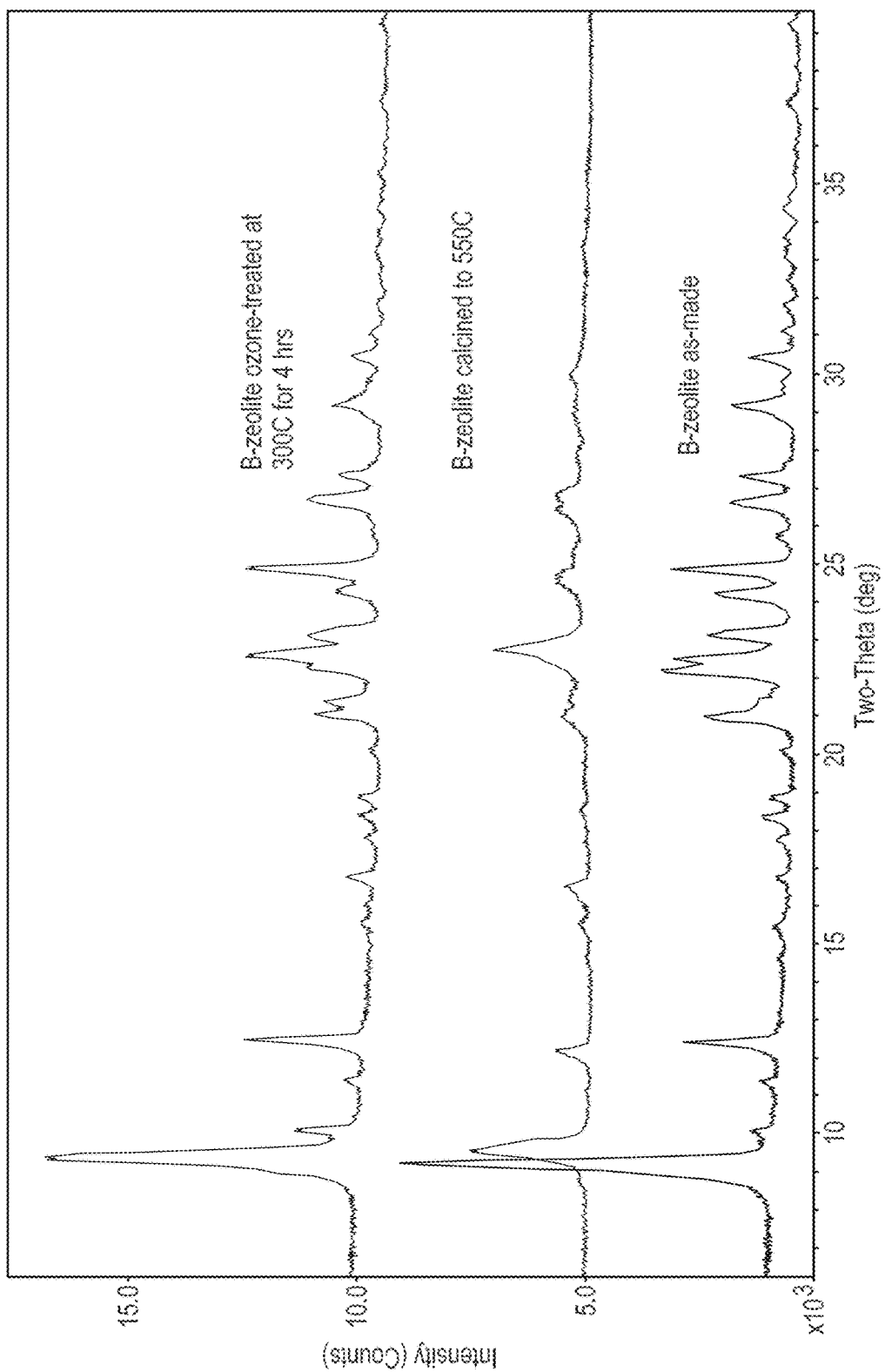
FIG. 4 shows the X-ray diffraction patterns of the as-made, as-calcined, and ozone treated products of Example 3.
Figure 5:
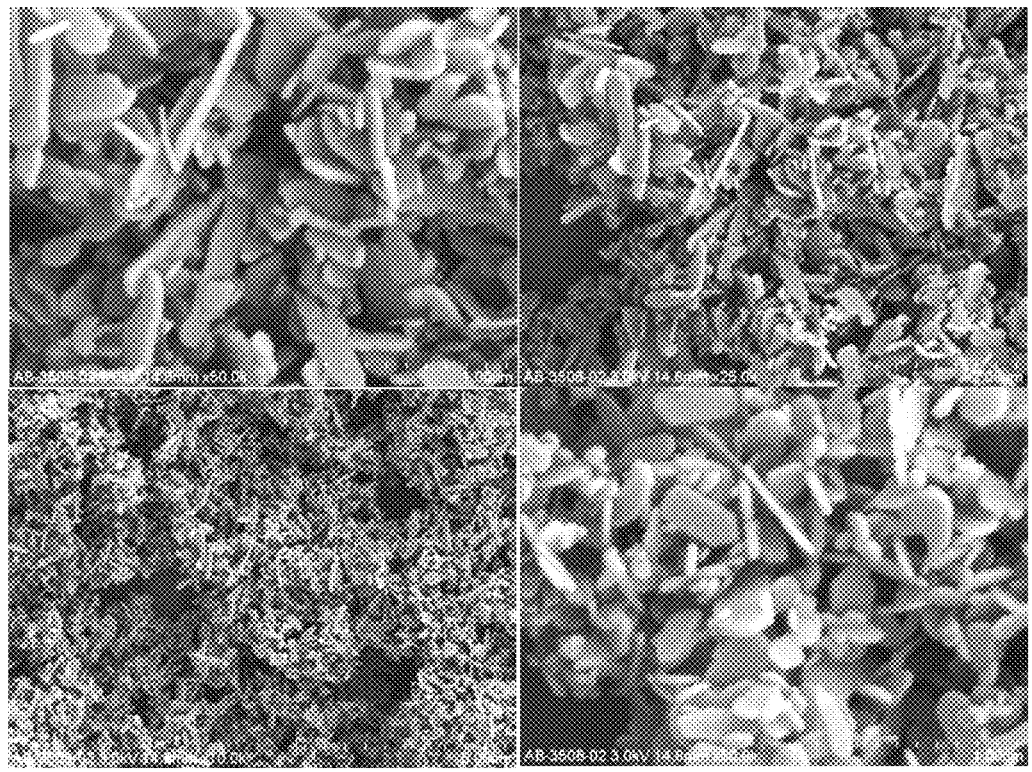
FIG. 5 shows SEM images of the as-made product of Example 3.

FIG. 4 (lower XRD pattern) shows the powder diffraction pattern of the new phase, EMM-26, and FIG. 5 shows SEM images of the phase.

Part of the as-made product from Example 3 was heated inside a muffle furnace from ambient temperature (~20-25° C.) to ~400° C. at ~4° C./min under a nitrogen atmosphere, then heated to ~550° C. at ~4° C./min in air, and then maintained at ~550° C. in air for ~2 hours. The middle XRD pattern of FIG. 4 appeared to show appreciable loss in diffraction intensity and shifts in the peaks positions after calcination. Nonetheless, a powder diffraction pattern was observed to remain after calcination.

Figure 6:
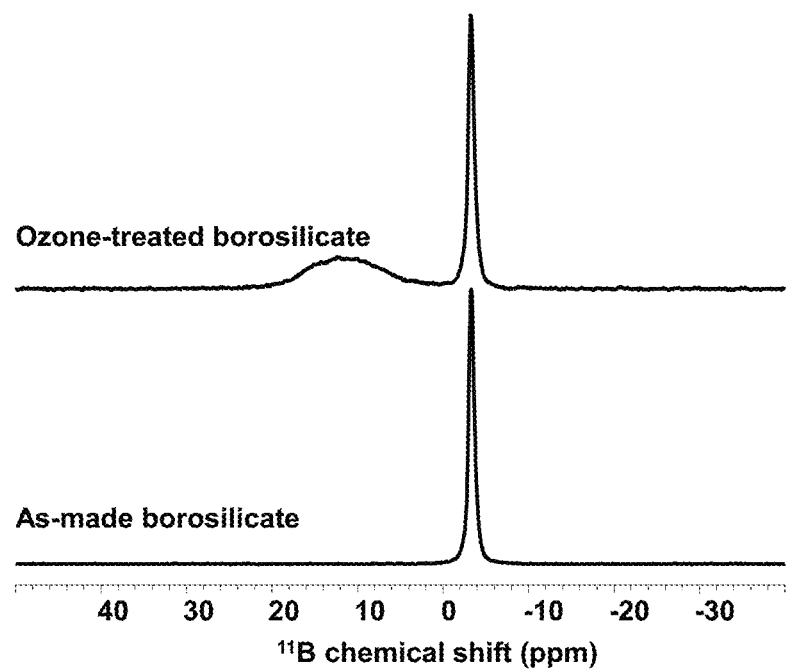
FIG. 6 shows the $^{11}B$ MAS NMR spectra of the as-made and ozone-treated products of Example 3.

Another part of the as-made product of Example 3 was treated with ozone in order to decompose/remove the occluded organic from the zeolite structure. A thin bed of the product was placed in a horizontal tube furnace with an air flow of ~3500 $cm^3$/min from an ozone generator. The ozone generator produced an air stream with about 1% ozone. The product was heated in the presence of the ozone-containing stream from ambient temperature (~20-25° C.) to ~300° C. over a ~30-minute period. The temperature was held at ~300° C. for ~4 hours, the ozone generation was discontinued, and then the furnace was allowed to cool to room temperature (~20-25° C.). The top XRD pattern of FIG. 4 shows the powder diffraction pattern of the ozone-treated product. Here it can be seen that the peaks in the pattern of the ozone-treated material appeared to have similar positions to those of the as-made material. The patterns of both the as-made and ozone-treated materials could be indexed on a similar C-centered orthorhombic unit cell. FIG. 6 shows the $^{11}$B MAS NMR spectra of the as-made and ozone-treated versions of the new EMM-26 phase. The resonance near −3.3 ppm is believed to be due to tetrahedrally coordinated boron, and the broad feature centered near 11.5 ppm is believed to be due to non-tetrahedrally coordinated boron. About 53% of the boron appeared to be non-tetrahedral after the ozone treatment.

Example 4

Within a tared Teflon liner for a ~23-mL steel Parr autoclave, ~0.99 grams of tetramethylorthosilicate and ~2.93 grams of a hydroxide solution of 1,6-bis(N-methylpyrrolidinium) hexane hydroxide ([OH]≈1.11 mmol/gram) were mixed together. The suspension was allowed to partially hydrolyze for about 20 minutes and then ~0.13 grams of ~50% HF solution and ~0.033 grams of boric acid were added and mixed to create a relatively uniform paste. The Teflon liners were placed within a vented hood to allow for overnight (~8-16 hours) evaporation. Additional deionized water was then added to the mixture to adjust the molar $H_2O$/Si ratio to ~10. About 0.01 grams of seeds of the as-made product from Example 3 were added to produce a gel having the following composition: Q/Si≈0.25; Si/B≈12; F/Si≈0.5; and $H_2O$/Si≈10.

Figure 7:
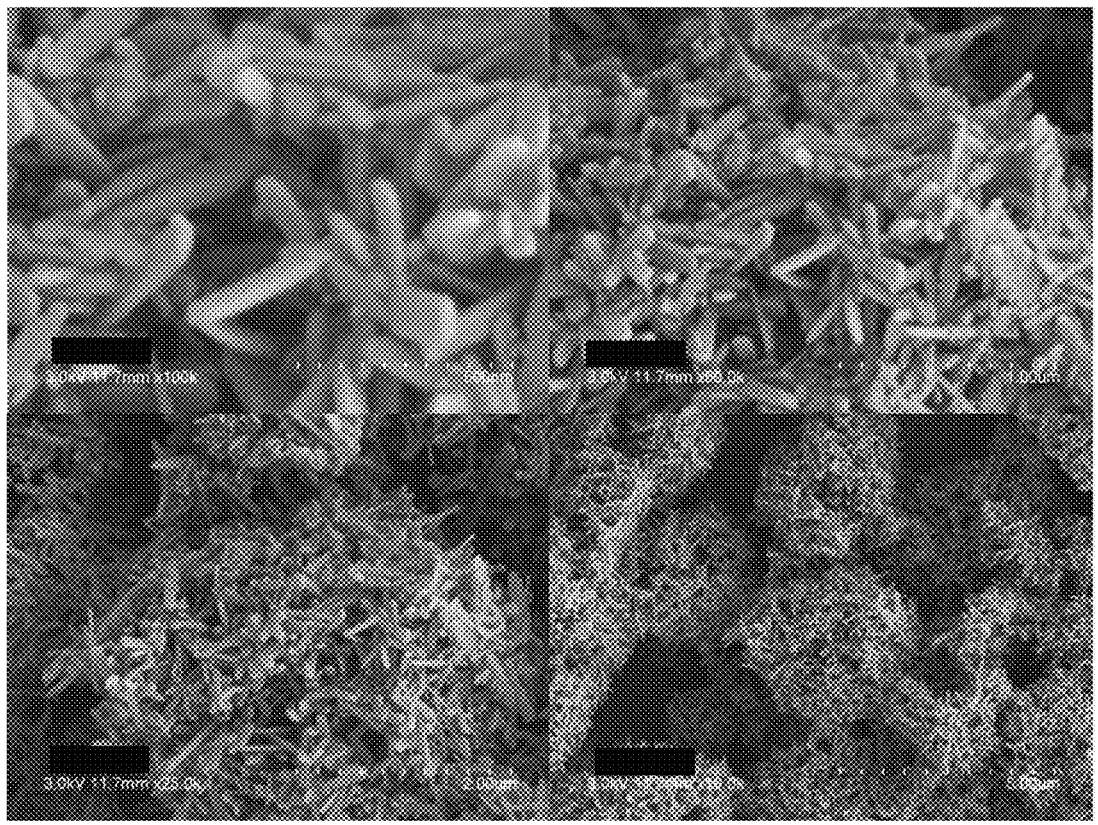
FIG. 7 shows SEM images of the as-made product of Example 4.

The Teflon liner was capped, sealed inside a steel Parr autoclave, and then heated at ~150° C. for ~22 days in ~23-mL tumbling (~50 rpm) autoclaves. The autoclaves were then removed from the oven and quenched to ambient temperature (~20-25° C.). The solids were isolated by filtration, washed exhaustively with deionized water, dried, and analyzed with powder XRD. Powder XRD showed that the sample appeared to be EMM-26 with a minor amount of zeolite beta. FIG. 7 shows SEM images of the product.

Example 5

Example 4 was repeated except that the synthesis was performed with a molar $H_2O$/Si ratio of ~7 and a Si/B ratio of ~20, and the reaction mixture was heated at ~175° C. for ~14 days. Powder XRD showed the product to be a mixture of EMM-26 and zeolite beta.

Example 6

Figure 8:
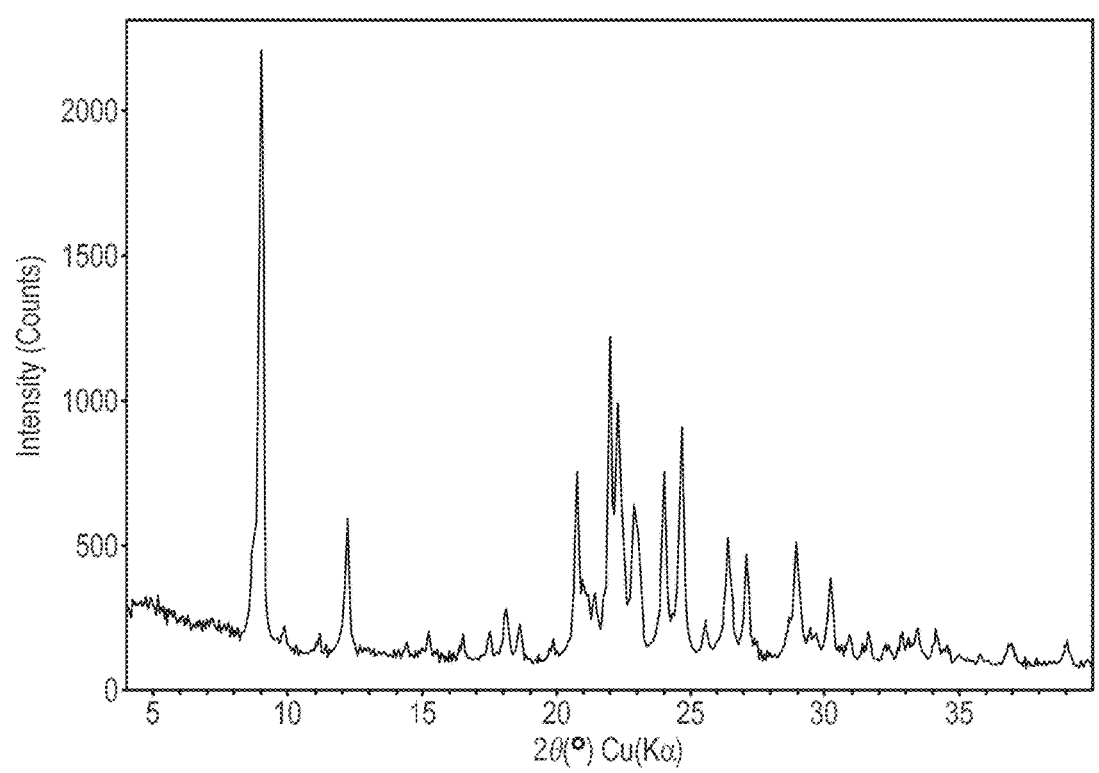
FIG. 8 shows the X-ray diffraction pattern of the product of Example 6.
Figure 9:
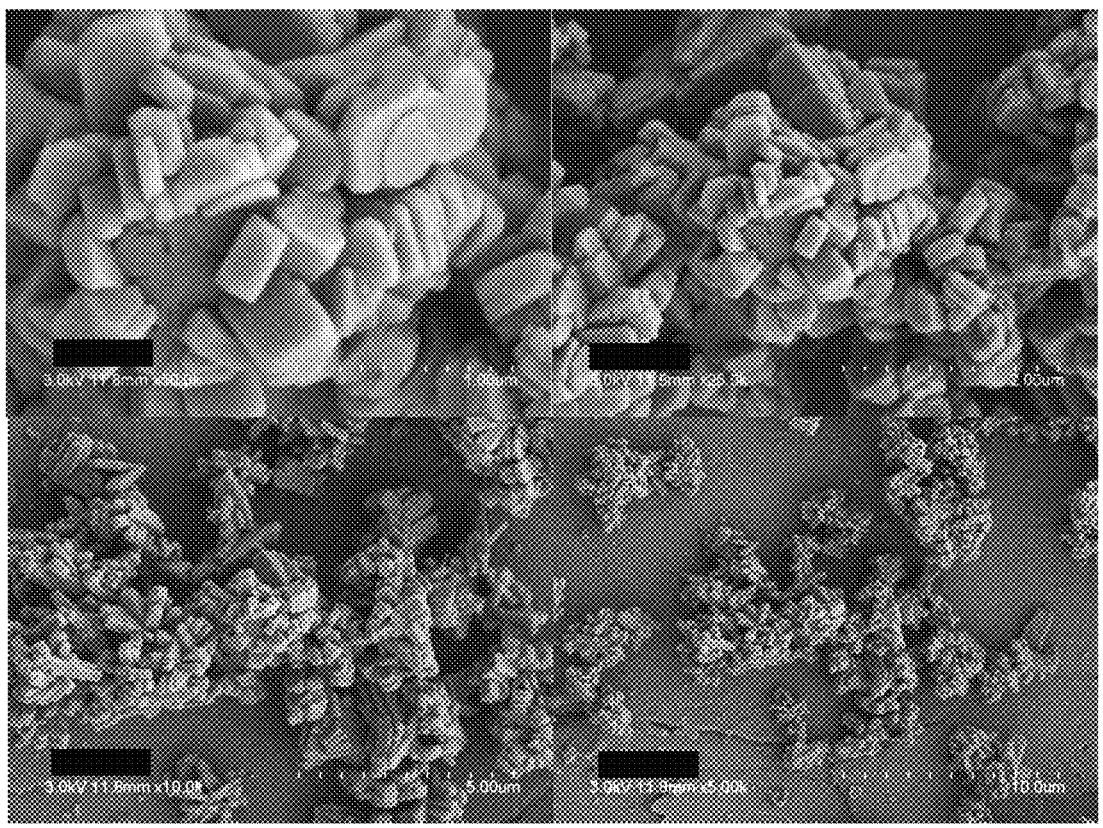
FIG. 9 shows SEM images of the as-made product of Example 6.

Example 5 was repeated except a molar Si/B ratio of ~12 was used, and the reaction mixture was heated for only ~7 days. Powder XRD (FIG. 8) shows the product to be pure EMM-26. FIG. 9 shows SEM images of the product. The crystals in these images were generally thicker than those in FIG. 5 and FIG. 7.

Example 7

A series of experiments were conducted on the relative sorption capacities of the as-calcined EMM-26 product of Example 3 for $CO_2$, $CH_4$, and $N_2$, as compared to the equivalent capacities for silica-CHA and silica-DDR framework type zeolites. Prior to the measurements, the zeolites were outgassed at ~400° C. under vacuum (e.g., not more than ~0.01 torr). Sorption isotherms were measured in the automated volumetric instrument Autosorb-1™ from Quantachrome Instruments.

Figure 10:
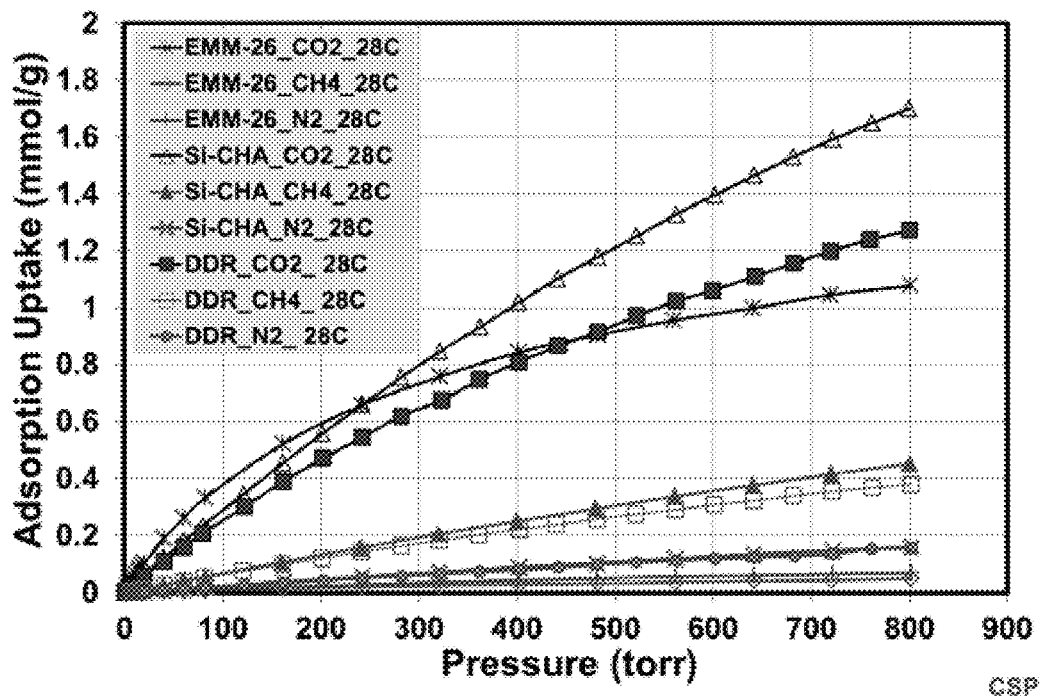
FIG. 10 is a graph plotting the relative sorption capacities of the as-calcined EMM-26 product of Example 3 for $CO_2$, $CH_4$, and $N_2$, as compared to the equivalent capacities for silica-CHA and silica-DDR framework type zeolites.

The results are shown in FIG. 10, in which the sorption uptake values were based on the weight of the dry sample. In addition, Table 5 lists the equilibrium $CO_2/CH_4$ sorption selectivity ($S_{CO2/CH4}$) and the equilibrium $CO_2/N_2$ sorption selectivity ($S_{CO2/N2}$) for each of the zeolites tested at ~800 torr partial pressure of the respective gas.

TABLE 5

| Sample and Treatment | $S_{CO2/CH4}$ | $S_{CO2/N2}$ |
|---|---|---|
| ~400° C. outgassed EMM-26 | ~22.6 | ~15.5 |
| ~400° C. outgassed DDR | ~3.4 | ~8.2 |
| ~400° C. outgassed CHA | ~3.8 | ~10.7 |

The experimental data show that $CO_2$ appeared to have access to the pore structure of EMM-26 and, as measured, the equilibrium $CO_2/CH_4$ and $CO_2/N_2$ sorption selectivities for EMM-26 appeared to be higher than corresponding values for silica DDR and silica CHA zeolites.

Example 8

Figure 11:
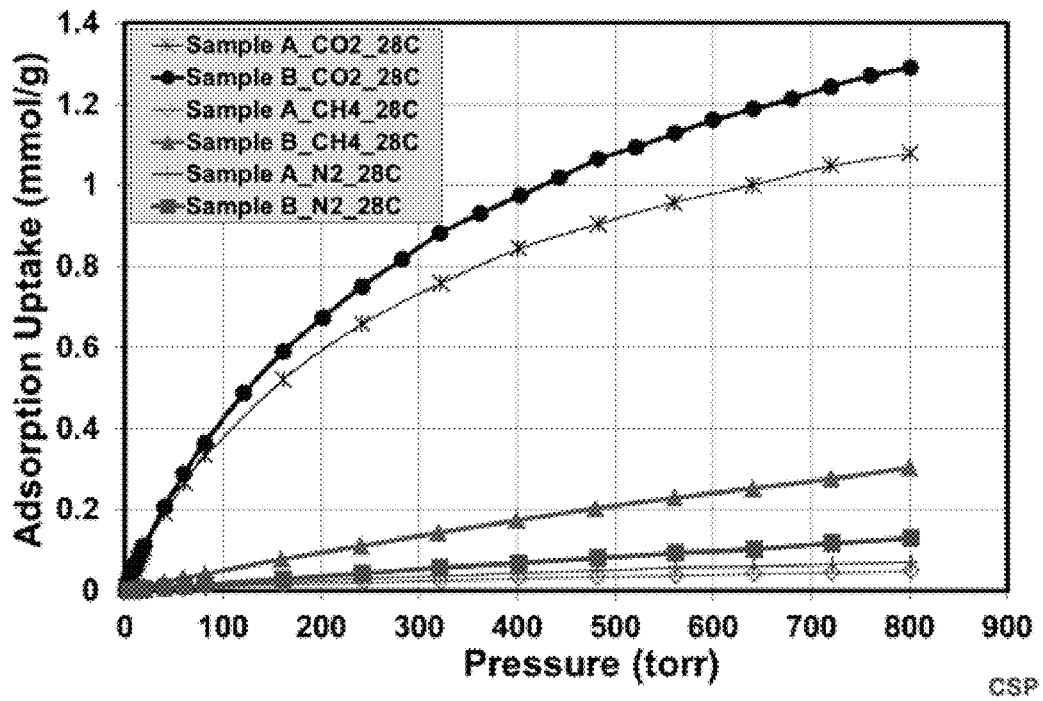
FIG. 11 is a graph comparing the relative sorption capacities of the as-calcined EMM-26 products of Examples 3 and 6 for $CO_2$, $CH_4$, and $N_2$.

The sorption experiments of Example 7 were repeated with the as-calcined EMM-26 product of Example 6. The results of both sets of experiments are plotted in FIG. 11, in which Sample A corresponds to the product of Example 3 and Sample B corresponds to the product of Example 6. It should be seen that the product of Example 6 appeared to have a higher sorption capacity than the product of Example 3.

Example 9

Diffusion of $CO_2$ and $CH_4$ in the EMM-26 structure was modeled using Molecular Dynamics simulations, following an established methodology as described in "Diffusion in Nanoporous Materials", J. Karger, D. N. Ruthven, D. N. Theodorou, Wiley-VCH, 2012 p. 227 [Karger et al.]. Equilibrium Molecular Dynamics simulations were performed in the NVT ensemble at different temperatures using Nose thermostat. The molecular model for the $CO_2$ molecule was taken from J. J. Potoff, J. I. Siepmann, *AIChE Journal*, 47 (2001), 1676, and that for the $CH_4$ molecule was taken from C. D. Wick, M. G. Martin, J. L. Siepmann, *J. Phys. Chem. B* 104 (2000) 8008. Interactions with the zeolite framework were used as described in O. Talu, A. L. Myers, *Colloids and Surfaces A: Physicochem. Eng. Aspects* 187-188 (2001) 83, using Lorentz-Berthelot combining rules. Charges on the zeolite framework were identified to be Si(+2) and O(−1). Self-diffusion coefficients were calculated from mean-square displacements of molecules using the Einstein relation [see Karger et al.]. Simulations predicted the diffusivity of $CO_2$ at ambient temperature (~300° K) and low loadings (<~1 mmol/gram) between 1E-10 $m^2$/sec and 1E-9 $m^2$/sec. Simulations predicted much slower diffusivity of $CH_4$. The estimated diffusivity of $CH_4$ was on the order of 1E-13 $m^2$/sec. These simulations were performed with the rigid framework structure. It is expected that, when using a more realistic flexible framework model, e.g., as disclosed in R. Awati, P. I. Ravikovitch, D. S. Sholl, *J. Phys. Chem. C* 117 (2013) 13462, the diffusivity of $CH_4$ will be on the order of 1e-12 $m^2$/sec to 1e-11 $m^2$/sec. The simulation results suggest that EMM-26 should be highly kinetically selective, with the separation factors, defined as the ratio of $CO_2$ to $CH_4$ diffusivities, greater than ~10, more likely greater than ~100, and possibly even greater than ~500.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

What is claimed is:

1. A synthetic crystalline material having a framework of tetrahedral atoms (T) connected by bridging atoms, the tetrahedral atom framework being defined by connecting the nearest tetrahedral (T) atoms in the manner shown in Table 1:

TABLE 1

| | |
|---|---|
| T1 | T2, T45, T47, T95 |
| T2 | T1, T20, T29, T42 |
| T3 | T42, T45, T88, T94 |
| T4 | T5, T8, T20, T34 |
| T5 | T4, T6, T17, T18 |
| T6 | T5, T7, T63, T65 |
| T7 | T6, T15, T28, T39 |
| T8 | T4, T39, T63, T72 |
| T9 | T10, T13, T32, T59 |
| T10 | T9, T11, T24, T57 |
| T11 | T10, T12, T55, T58 |
| T12 | T11, T22, T30, T40 |
| T13 | T9, T40, T55, T78 |
| T14 | T15, T19, T31, T95 |
| T15 | T7, T14, T16, T94 |
| T16 | T15, T17, T76, T78 |
| T17 | T5, T16, T29, T39 |
| T18 | T5, T20, T34, T96 |
| T19 | T14, T39, T58, T76 |
| T20 | T2, T4, T18, T26 |
| T21 | T22, T25, T33, T90 |
| T22 | T12, T21, T23, T89 |
| T23 | T22, T24, T70, T72 |
| T24 | T10, T23, T27, T40 |
| T25 | T21, T40, T65, T70 |
| T26 | T20, T60, T81, T83 |
| T27 | T24, T48, T67, T92 |
| T28 | T7, T60, T61, T79 |
| T29 | T2, T17, T43, T74 |
| T30 | T12, T53, T69, T84 |
| T31 | T14, T46, T77, T94 |
| T32 | T9, T56, T57, T87 |
| T33 | T21, T51, T71, T89 |
| T34 | T4, T18, T64, T82 |

TABLE 1-continued

| | |
|---|---|
| T35 | T56, T58, T71, T72 |
| T36 | T64, T65, T77, T78 |
| T37 | T46, T47, T82, T83 |
| T38 | T51, T52, T87, T88 |
| T39 | T7, T8, T17, T19 |
| T40 | T12, T13, T24, T25 |
| T41 | T69, T73, T92, T93 |
| T42 | T2, T3, T60, T96 |
| T43 | T29, T44, T47, T75 |
| T44 | T43, T45, T74, T82 |
| T45 | T1, T3, T44, T46 |
| T46 | T31, T37, T45, T80 |
| T47 | T1, T37, T43, T73 |
| T48 | T27, T49, T52, T68 |
| T49 | T48, T50, T67, T87 |
| T50 | T49, T51, T91, T93 |
| T51 | T33, T38, T50, T85 |
| T52 | T38, T48, T91, T96 |
| T53 | T30, T54, T58, T85 |
| T54 | T53, T55, T71, T84 |
| T55 | T11, T13, T54, T56 |
| T56 | T32, T35, T55, T68 |
| T57 | T10, T32, T59, T73 |
| T58 | T11, T19, T35, T53 |
| T59 | T9, T57, T66, T92 |
| T60 | T26, T28, T42, T95 |
| T61 | T28, T62, T65, T80 |
| T62 | T61, T63, T77, T79 |
| T63 | T6, T8, T62, T64 |
| T64 | T34, T36, T63, T75 |
| T65 | T6, T25, T36, T61 |
| T66 | T59, T69, T86, T88 |
| T67 | T27, T49, T68, T72 |
| T68 | T48, T56, T67, T70 |
| T69 | T30, T41, T66, T90 |
| T70 | T23, T25, T68, T71 |
| T71 | T33, T35, T54, T70 |
| T72 | T8, T23, T35, T67 |
| T73 | T41, T47, T57, T86 |
| T74 | T29, T44, T75, T78 |
| T75 | T43, T64, T74, T76 |
| T76 | T16, T19, T75, T77 |
| T77 | T31, T36, T62, T76 |
| T78 | T13, T16, T36, T74 |
| T79 | T28, T62, T80, T83 |
| T80 | T46, T61, T79, T81 |
| T81 | T26, T80, T82, T96 |
| T82 | T34, T37, T44, T81 |
| T83 | T26, T37, T79, T93 |
| T84 | T30, T54, T85, T88 |
| T85 | T51, T53, T84, T86 |
| T86 | T66, T73, T85, T87 |
| T87 | T32, T38, T49, T86 |
| T88 | T3, T38, T66, T84 |
| T89 | T22, T33, T90, T93 |
| T90 | T21, T69, T89, T91 |
| T91 | T50, T52, T90, T92 |
| T92 | T27, T41, T59, T91 |
| T93 | T41, T50, T83, T89 |
| T94 | T3, T15, T31, T95 |
| T95 | T1, T14, T60, T94 |
| T96 | T18, T42, T52, T81; | wherein said crystalline material is prepared from a reaction mixture comprising water, an oxide of a tetravalent element Y ($YO_2$), an oxide of a trivalent element X ($X_2O_3$), and a structure directing agent Q, said reaction mixture having a $X_2O_3$:$YO_2$ molar ratio of about 0.015:0.125, a $H_2O$:$YO_2$ molar ratio of about 1:80, and a Q/$YO_2$ molar ratio of about 0.05:0.5; and wherein the oxide of the tetravalent element Y ($YO_2$) is a colloidal suspension of silica, the oxide of the trivalent element X ($X_2O_3$) is boric acid, and the structure directing agent Q is selected from the group consisting of 1,6-bis(N-methylpyrrolidinium)hexane hydroxide and 1,6-bis(N-methylpiperidinium)hexane hydroxide.

2. The crystalline material of claim 1, wherein the tetrahedral atoms include one or more elements selected from the group consisting of B, Al, Si, and Ge.

3. The crystalline material of claim 1, wherein the tetravalent element Y is silicon and/or germanium and the trivalent element X is boron and/or aluminum.

4. The crystalline material of claim 1, wherein the bridging atoms include one or more elements selected from the group consisting of O, N, F, S, Se, and C.

5. The crystalline material of claim 1, wherein the bridging atoms include oxygen.

6. The crystalline material of claim 1, wherein the ratio of Q/Si is about 0.1 to about 0.25, the ratio of Si/B is about 5 to about 20; and the ratio of $H_2O$/Si is about 7 to about 35.

* * * * *